J. Cartwright,
Metal Can.
N° 76,890.　　　　Patented Apr. 21, 1868.
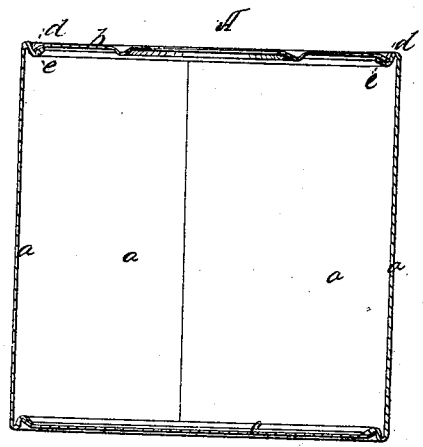
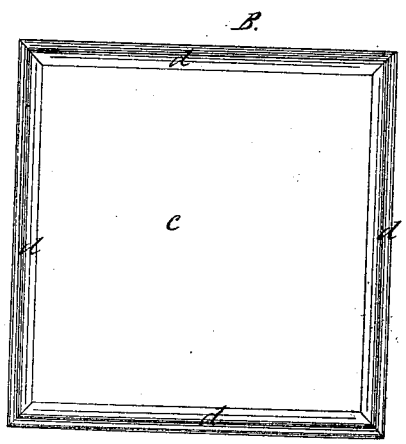
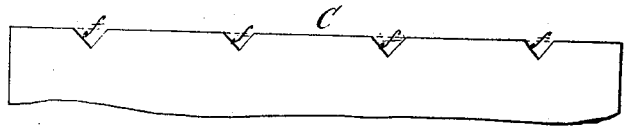
Witnesses:　　　　　　　　　　　　　　　　Inventor:

United States Patent Office.

JOSEPH CARTWRIGHT, OF SOUTH READING, MASSACHUSETTS, ASSIGNOR TO HIMSELF, JAMES CARTWRIGHT, JR., AND W. K. LEWIS.

*Letters Patent No. 76,890, dated April 21, 1868.*

IMPROVEMENT IN SHEET-METAL CANS.

*The Schedule referred to in these Letters Patent and making part of the same.*

TO ALL WHOM IT MAY CONCERN:

Be it known that I, JOSEPH CARTWRIGHT, of South Reading, in the county of Middlesex, and State of Massachusetts, have invented an Improved Metal Can; and I do hereby declare that the following, taken in connection with the drawings which accompany and form part of this specification, is a description of my invention sufficient to enable those skilled in the art to practise it.

My invention relates to the construction of square or flat-sided cans, or cans that are angular, and not round, in section. Such cans have heretofore been generally made by first bending the parts forming the body into a square prismatic form, and uniting the edges brought together, and then by soldering on heads, which were made of size just sufficient to cover the ends of the prism, the plain straight edges of the square heads being joined to the plain straight edges of each side of the body.

The object of my invention is not only to facilitate the manufacture of square or prismatic cans, but to make such cans with smooth, rounded edges, and more perfect joints.

My invention consists of a square or prismatic can, in which each edge of the body standing at an angle to the adjacent ones, has an inwardly-projecting groove or channel formed in it, into which a lip or flange on one side of the head projects when the head is applied, these grooves being formed when the body is in plain or sheet form, or before the sheet is bent to form the respective sides.

Round cans have been made with a channel at each end of each, to receive a lip turned down from the head, but from my experience in such manufacture, I believe that it is impractical, or at least very difficult to produce perfect cans of that class, as the groove has to be produced by dies after the body of the can is formed, and such treatment distorts the can, or tends to bulge out the sides.

But in my can, I form the groove (as before observed) while the metal is flat, no stress in this operation coming upon any portion of the metal, excepting upon the edge, which forms the groove.

The drawings represent a can made in accordance with my invention.

A shows a vertical section of the can.

B, a plan of the open can.

C shows one edge of the plate (reduced) from which the body of the can is to be made, the view representing the edge as it appears before it is bent or grooved, and as prepared for being grooved.

$a\ a$ denote the vertical sides or walls which form the body of the can. $b\ c$, the respective heads, (or $b$ the head, and $c$ the bottom thereof.) $d$ is a groove or channel, formed all along the top and bottom of each side, $a$, (as seen at A,) this groove receiving a slightly-bent edge or lip, $e$, turned down at each edge of the heads $b\ c$, as seen at B, solder being melted along the groove at the edge of the heads to close the joint.

To form the channels or grooves $d$, I first take the strip of metal, cut to the proper length to form the four sides, and of the proper width for the depth of the can, and at each point on the edge where the metal is to be turned to form a corner of the can, I cut out a goring-piece, $f$, (as seen at C,) of a depth equal to the width of the metal to be used for the formation of the groove, and of a width at the edge of the plate such, that when the two sides of the metal adjacent to the notch made by cutting away this piece are bent at right angles, the opposite edges of the notch will join or butt, as seen at A.

In a suitable crimping-machine, or by the use of dies, I now bend each edge between these notches, (and between each outer notch and the adjacent end of the plate,) to form the groove or channel $d$, and then over a suitable block or former, I bend the metal, to bring the adjacent sides $a$ into right-angular position, to form the body, closing up in the usual manner the vertical edges brought together by this bending. Each groove $d$ thus made is brought into direct connection with the adjacent groove, thus forming a continuous groove or channel all around each end of the can, as seen at A and B, this channel receiving the lip around the head, as seen at B.

By this construction, a can perfect in form is made, no distortion whatever of the walls being produced, as is and must be the case where the groove is made after the body is formed up, and it will readily be seen that there are straight lines or grooves to solder over, upon which straight lines joints can be much more readily and perfectly closed by solder than when the grooves or joints to be closed are curved.

I claim a polygonal can, having but one side-joint, and a groove, $d$, (for receiving a lip turned down from the head,) when said groove is made before the body is formed or bent up, substantially as described.

JOSEPH CARTWRIGHT.

Witnesses:
   J. B. CROSBY,
   FRANCIS GOULD.